United States Patent [19]

Elliott, deceased et al.

[11] Patent Number: 5,213,286
[45] Date of Patent: May 25, 1993

[54] DOOR FOR AIRCRAFT NACELLE

[75] Inventors: Homer J. Elliott, deceased, late of Cincinnati, by Lydia B. Elliott, legal representative; Jarvis G. Higginbotham, Hamilton; James E. Durham, Cincinnati, all of Ohio

[73] Assignee: General Electric Company, Cincinnati, Ohio

[21] Appl. No.: 803,774

[22] Filed: Dec. 5, 1991

Related U.S. Application Data

[63] Continuation of Ser. No. 597,923, Oct. 10, 1990, abandoned.

[51] Int. Cl.⁵ .............................................. B64D 29/06
[52] U.S. Cl. ................................ 244/129.4; 244/129.5; 16/368; 49/248
[58] Field of Search ................ 292/DIG. 49, 100; 244/129.4, 129.5; 16/368, 369, 370; 49/248

[56] References Cited

U.S. PATENT DOCUMENTS

| | | | |
|---|---|---|---|
| 2,131,116 | 9/1938 | Northup | 16/370 |
| 3,347,578 | 10/1967 | Sheehan et al. | 292/113 |
| 3,486,721 | 12/1969 | Myczinski | 244/53 |
| 3,907,224 | 9/1975 | Stearns | 244/110 |
| 4,030,291 | 6/1977 | Sargisson | 60/226 |
| 4,294,039 | 10/1981 | Dalheimer et al. | 49/298 |
| 4,382,551 | 5/1983 | Thayer | 239/265.29 |
| 4,383,347 | 5/1983 | La Conte | 16/360 |
| 4,399,966 | 8/1983 | Crudden et al. | 244/129.4 |
| 4,510,714 | 4/1985 | Kasper et al. | 244/129.5 |
| 4,679,750 | 7/1987 | Burhans | 244/129.4 |

Primary Examiner—Charles A. Marmor
Assistant Examiner—Carla Mattix
Attorney, Agent, or Firm—Jerome C. Squillaro; John R. Rafter

[57] ABSTRACT

The invention concerns a hinge system for cowl doors in nacelles for aircraft engines. The invention allows the cowl door to be opened without invasion of the interior of the nacelle. Invasion requires that some interior space of the nacelle be kept free of equipment. The invention eliminates this requirement, allowing otherwise idle space to be utilized.

5 Claims, 5 Drawing Sheets

DOOR FOR AIRCRAFT NACELLE

This application is a continuation of application Ser. No. 07/597,923, filed Oct. 10, 1990 now abandoned.

The invention relates to an access door for aircraft nacelles.

BACKGROUND OF THE INVENTION

FIG. 1 illustrates an aircraft powered by fuselage-mounted engines (not shown) which are each contained within a nacelle 3. It is necessary for technicians to gain access to the interior of each nacelle 3, and so cowl doors 6A and 6B are provided. These doors are shown in more detail in FIG. 2. The two doors 6A and 6B enclose the engine. To access the engines, the upper door 6A and lower door 6B swings open about pivot points 14A and 14B.

However, the doors 6A and 6B, in swinging open, causes edge 18 to invade the space within the nacelle 3, as indicated by dimension 24, which is the depth of the invasion. This invasion is undesirable where the clearance 27 (shown at a location remote from the invasion for clarity) between the engine 30 and the inner surface 33 of the nacelle is small: the invasion can cause the edge 18 to contact the engine 30, which is to be avoided.

Prevention of such contact by increasing the clearance 27 is, in general, not feasible, because the clearance 27 is determined largely by considerations of weight and aerodynamic drag of the nacelle 3, and these considerations take precedence over door geometry. Thus, to prevent contact between edge 18 and the engine 30, the door opening mechanism must be re-designed.

OBJECTS OF THE INVENTION

It is an object of the invention to provide an improved system for obtaining access to an engine disposed in the interior of an aircraft nacelle.

It is a further object of the invention to provide a linkage system for opening and supporting the nacelle cowl door and provide a linkage system which does not invade the nacelle interior upon opening.

SUMMARY OF THE INVENTION

In one form of the invention, a cowl door is supported from an aircraft nacelle such that the door not only opens to allow access into the nacelle, but also bodily swings away from the engine during opening. In another form of the invention, the opening and the swinging are linked such that they occur together.

DETAILED DESCRIPTION OF THE INVENTION

Figure 1:
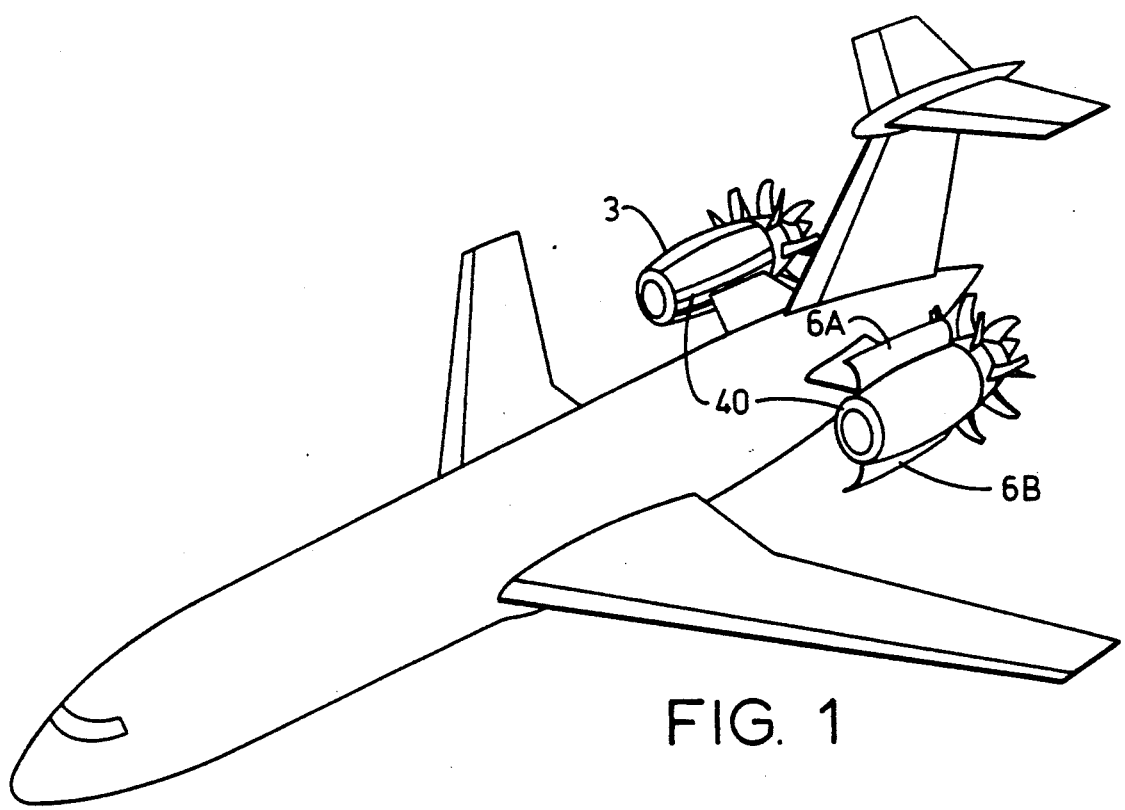
FIG. 1 illustrates aircraft nacelles 3 with which the present invention can be used.
Figure 3:
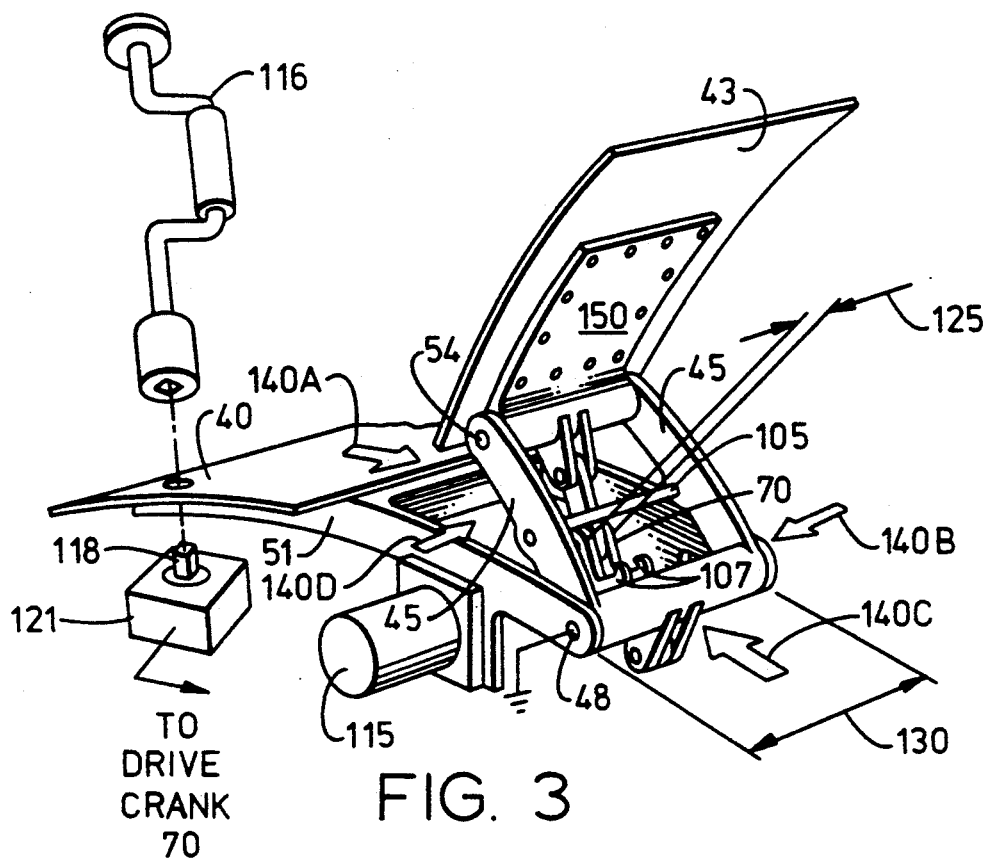
FIG. 3 illustrates a perspective view of one form of the invention.

FIG. 3 illustrates one form of the invention, in which nacelle surface 40 corresponds to nacelle surface 40 in FIG. 1. A door 43 in FIG. 3 allows one to gain access to the interior of the nacelle. Because the linkage supporting the door 43 is somewhat complex, a simplified explanation of the linkage will first be given, followed by a more detailed explanation.

Figure 4:
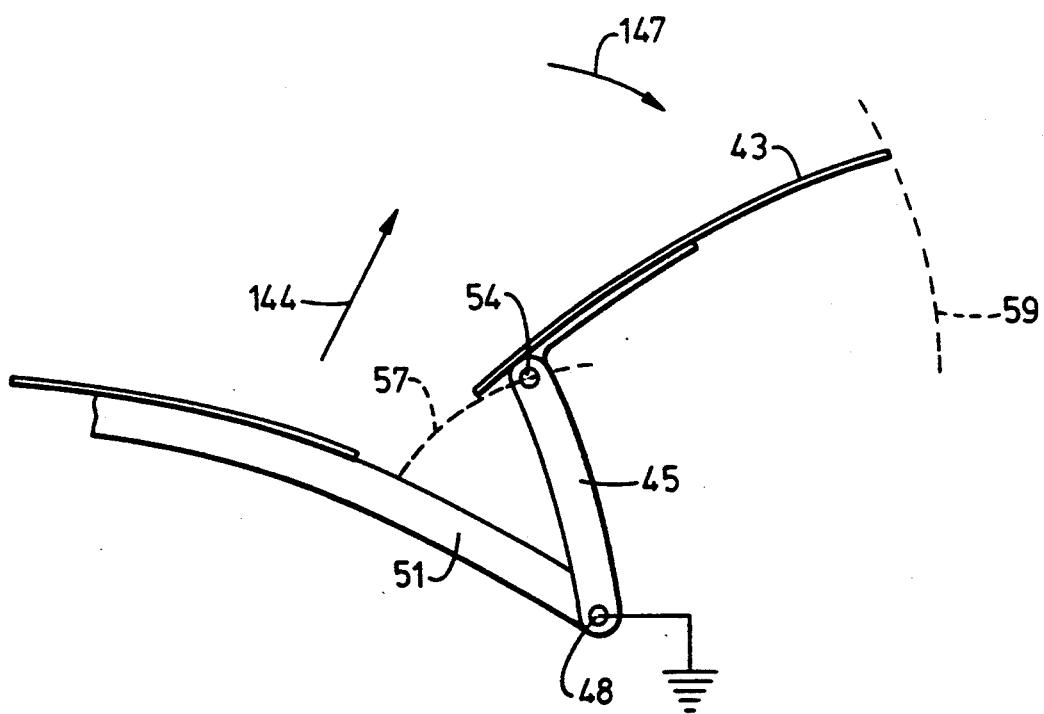
FIG. 4 illustrates a simplified cross-sectional view of the invention of FIG. 3, but with some components eliminated for ease of explanation and understanding.

In FIG. 4, a radius arm 45 swings about a first pivot 48 which is fixed upon a frame 51 of the nacelle. The first pivot 48 does not move with respect to the nacelle frame 51, as indicated by the ground symbol extending from the pivot 48. Frame 51 is part of the support structure of the skin of the nacelle 3. The radius arm 45 supports the door 43 by means of a second pivot 54, also shown in FIG. 3. The second pivot 54, unlike the first pivot 48, does move with respect to the nacelle frame 51; the second pivot 54 travels along arcuate path 57 in FIG. 4 as the radius arm 45 rotates about the first pivot 48.

Thus, as shown in FIG. 4, the door 43 rotates about the second pivot 54, as indicated by dashed arc 59, while the second pivot 54 rotates about the first pivot 48, as indicated by dashed arc 57, with the radius arm 45 acting as a radius. This discussion will now consider the linkage which synchronizes the motion of door 43 with the motion of the radius arm 45.

Figure 5:
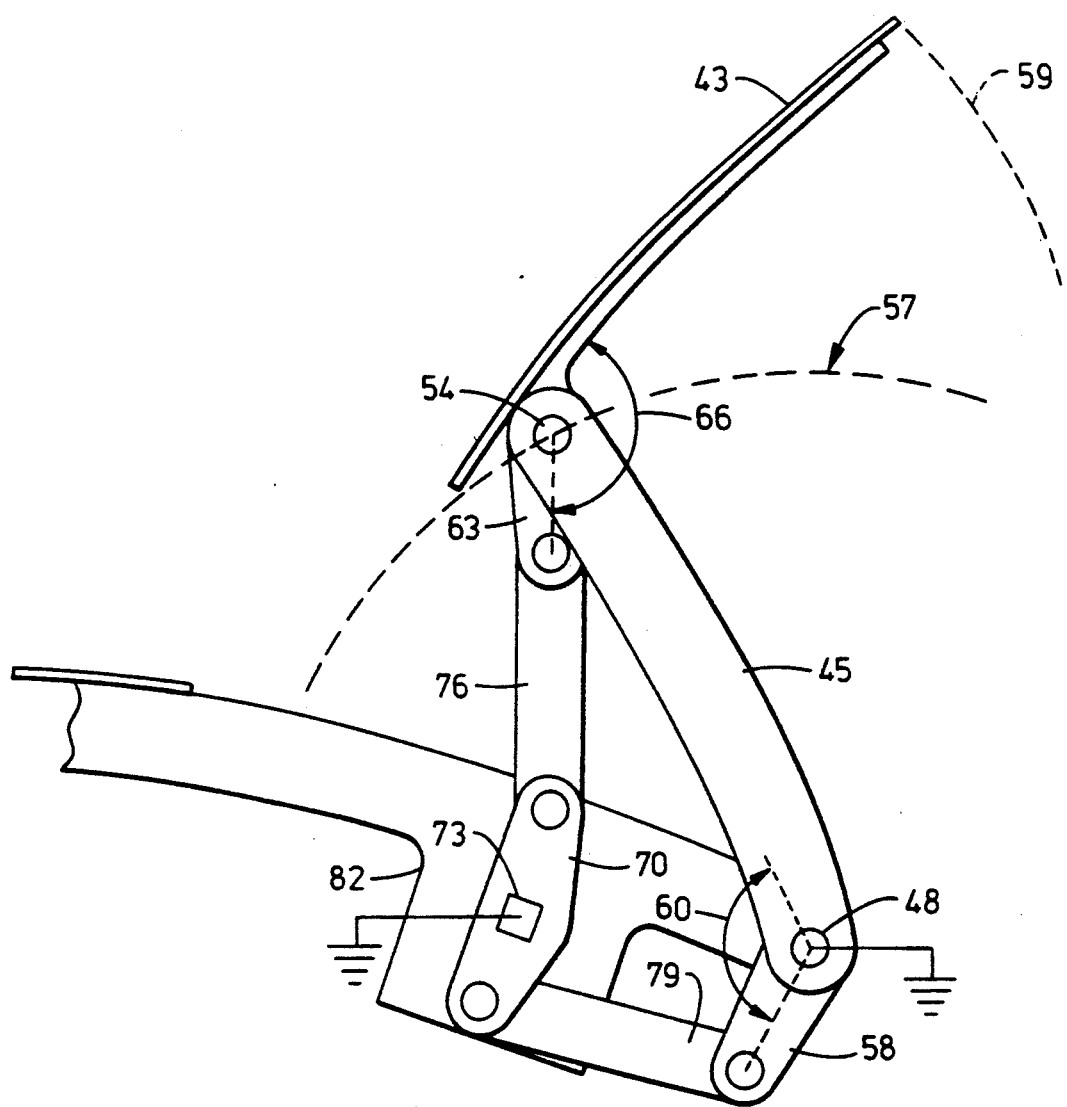
FIGS. 5 and 6 illustrate views similar to that of FIG. 4, but with components restored to show operation of the invention in greater detail.
Figure 6:
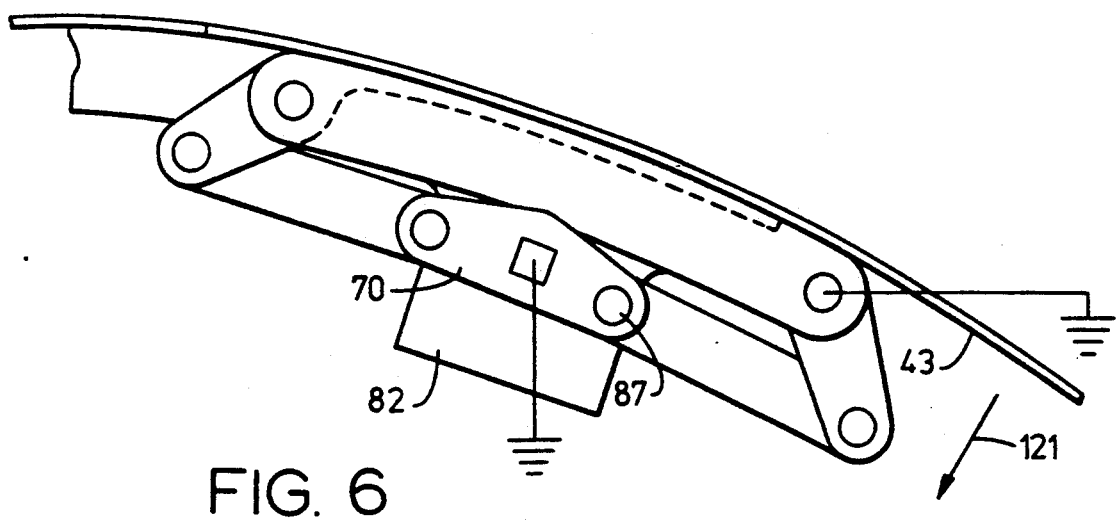
Figure 7:
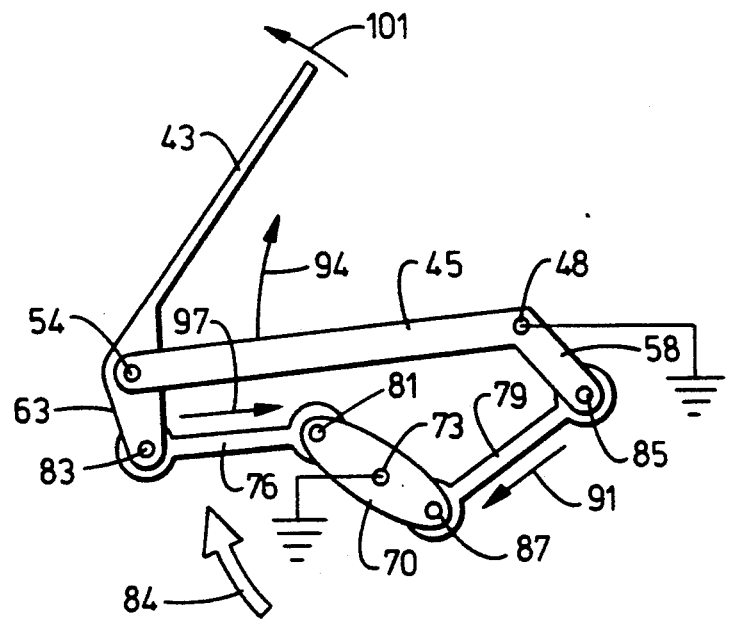
FIG. 7 illustrates a simplified schematic of the views of FIGS. 5 and 6.

The linkage of FIG. 3 is shown in side view in FIGS. 5 and 6. A simplified schematic of the linkage is shown in FIG. 7, and should be viewed together with FIGS. 5 and 6. FIG. 5 shows the door 43 in an open position, while FIG. 6 shows the door 43 in a closed position. In moving the door 43 from the closed position to the open position, the linkage functions as follows. As stated above, the first pivot 48 does not move, but the radius arm 45 rotates about the first pivot 48 as indicated by dashed arc 57 in FIG. 5. A first crank 58, termed the radius arm crank, is rigidly fastened to the radius arm 45: angle 60, between the radius arm 45 and the radius arm crank 58, is unchanging.

A second crank 63, termed the door crank, is integral to the door hinge 150 which is rigidly fastened to the door 43: angle 66, between the door 43 and the door crank, is also unchanging. A third crank 70, termed a drive crank, rotates about a third pivot 73, and drives both the radius arm crank 58 and the door crank 63 by means of a door link 76 and a radius arm link 79, which are pivotally pinned by pins 81, 83, 85, and 87, as shown in FIG. 7.

The third pivot 73, about which the drive crank 70 rotates, is supported and driven by a drive shaft which is integral to the nacelle frame. Thus, the third pivot 73, like the first pivot 48, is not movable with respect to the nacelle frame 51, as indicated by the ground symbol extending from the third pivot 73.

In operation, the drive crank 70 in FIG. 7 rotates as indicated by arrow 84, thus pulling radius arm crank 58 as indicated by arrow 91, thus rotating the radius arm 45 as indicated by arrow 94. At the same time, the drive crank 70 pulls the door link 76 as indicated by arrow 97, thus causing the door 43 to rotate as indicated by arrow 101.

The preceding paragraph has indicated that the drive crank 70 "pulls" door crank 63. This "pulling" may seem peculiar, because pin 81 in FIG. 7 may at first appear to be moving toward the door crank 63. However, the door crank 63 is being pulled away from pin 81, as indicated by arrow 94, by the motion of the radius arm 45. Thus, link 76 does in fact "pull" the door crank 63 during opening of the door 43.

Figure 8:
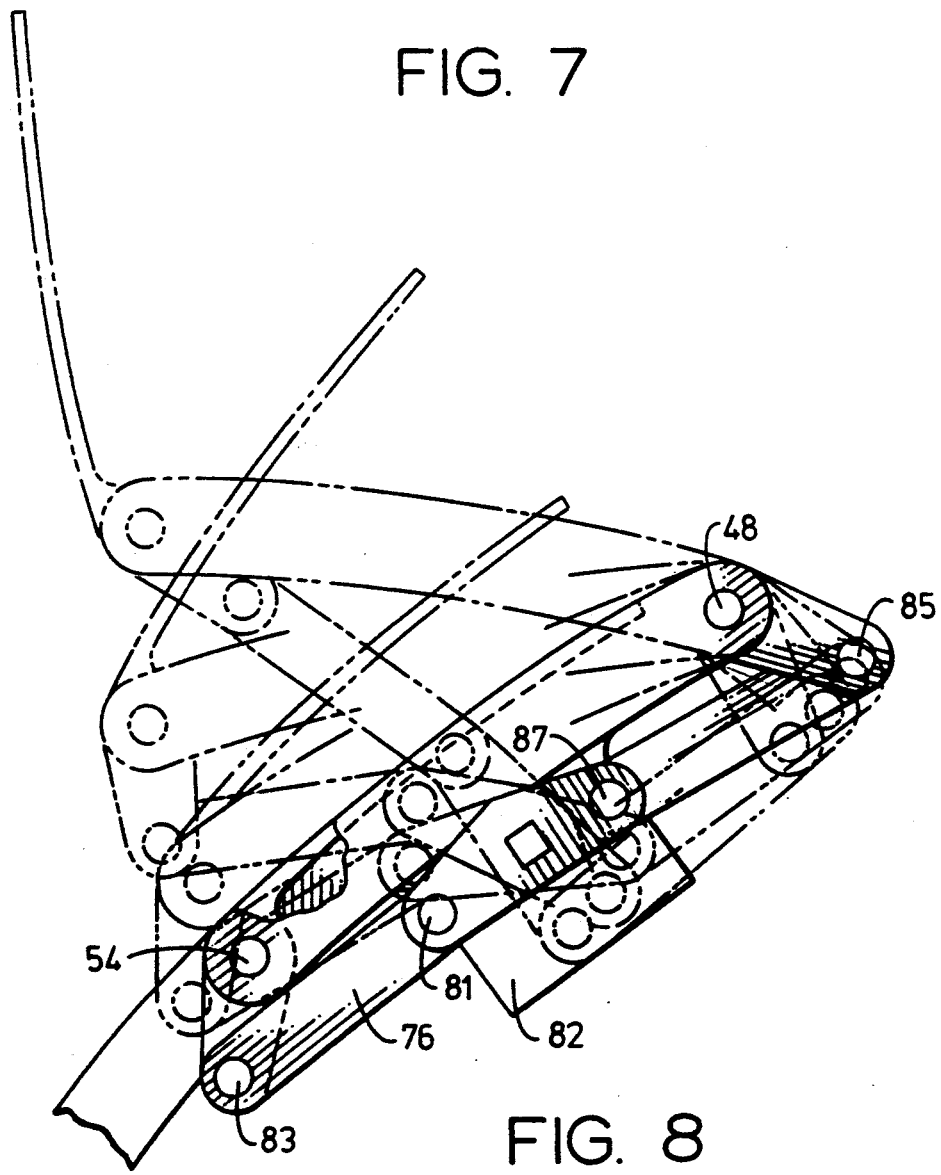
FIG. 8 illustrates a sequence of positions attained by the linkage of FIGS. 5 and 6 during door movement.

FIG. 8 illustrates a sequence of positions attained by the components of FIGS. 5 and 6 during door motion.

Figure 9A:
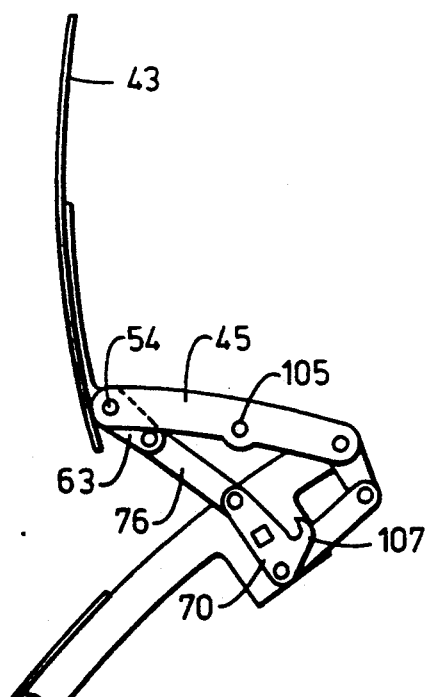
FIGS. 9A and 9B illustrate another form of the invention, which includes a latch 107 for locking the door 43 in a closed position.
Figure 9B:
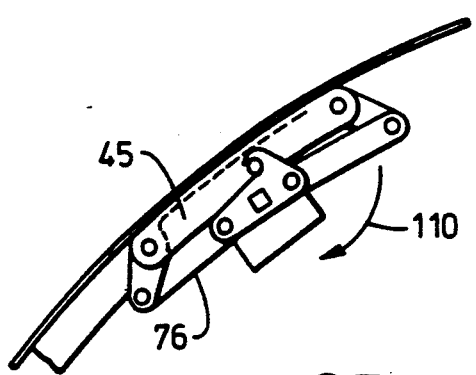

Another embodiment of the invention is shown in FIG. 9, wherein a lock-down bar 105, also shown in FIG. 3, is held in place by a latch, or hook, 107 carried by the drive crank 70. As shown in FIG. 9, the latch 107 hooks over the lock-down bar 105 and prevents rotation of the radius arm 45 until the drive crank 70 rotates in the direction of arrow 110 and swings the latch 107 sufficiently free of the lock-down bar 105. Further, rotation of the door 43 is prevented so long as the lock-down bar 105 is held captive by the latch 107 because, at this time, the door crank link 76 prevents rotation of the door crank 63 about the door pivot 54.

A motor 115 in FIG. 3 can be used to rotate the drive crank 70. Alternately, a crank 116 can be used to drive a lug 118 which operates a gear train 121 in order to rotate the drive crank 70.

Figure 2:
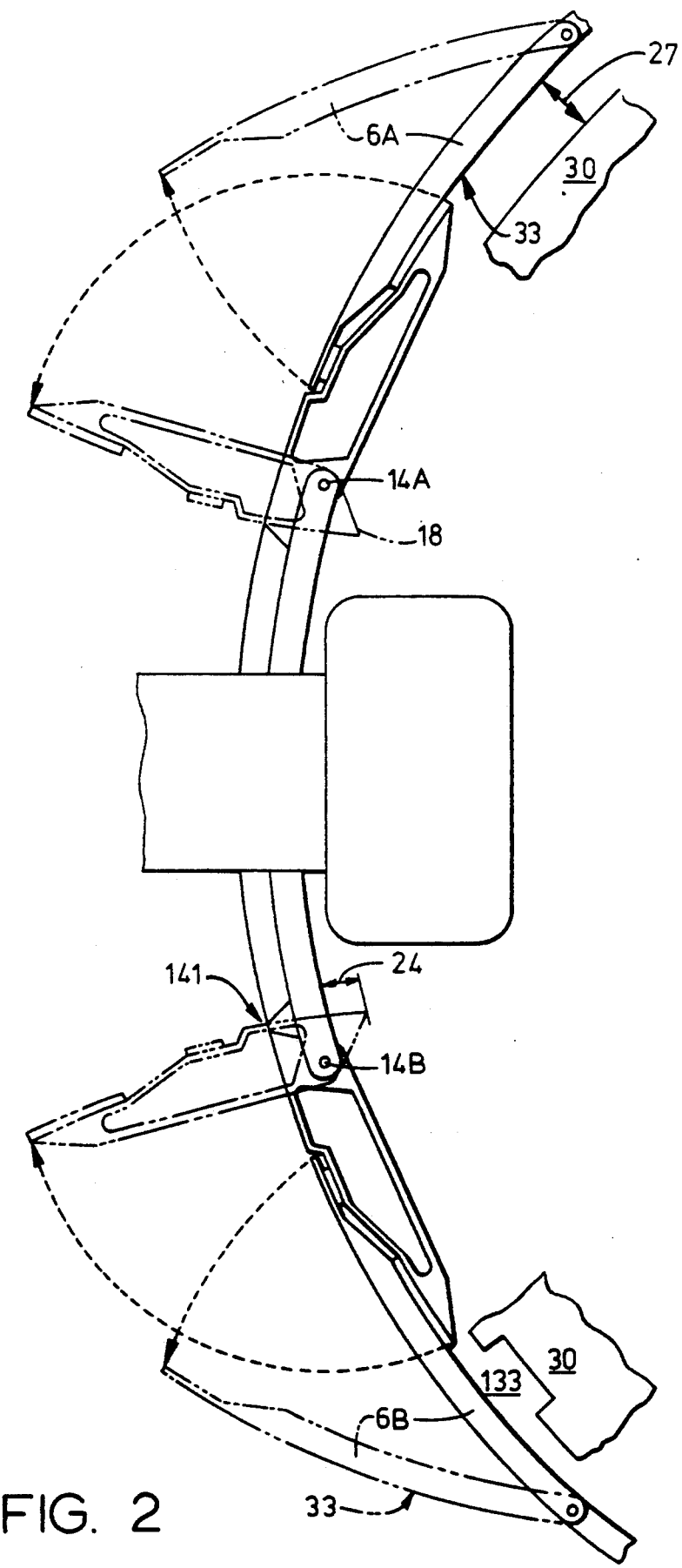
FIG. 2 illustrates a conventional cowl door in an aircraft nacelle.

An invention has been described wherein an access door 43 in FIGS. 3 and 5 swings open without invading the space within the nacelle 3 as does doors 6A and 6B in FIG. 2. While it may be true that the drive crank 70 in FIGS. 5 and 6 does cause pin 87 to move in the direction of arrow 121 in FIG. 6 during rotation, and that such motion may be viewed as an invasion, this invasion is very small and can be minimized by modifying radius arm crank. Also, the thickness 125 in FIG. 3 of the drive crank can be less than one inch. Further, the drive crank can be located at any point along length 130. Thus, it is probable that a cavity can be found in the space allocated to the engine, such as cavity 133 in FIG. 2, which will allow the invasion of the drive crank 70 during rotation.

Several important features of the invention are the following. One, pivot 54 forms a first axis about which the door 43 rotates, and the first axis itself moves outward from the nacelle during door opening, as indicated by arrow 94 in FIG. 7. The motion of the first axis provides a clearance which allows access along the path indicated by arrow 140A in FIG. 3. Such access is not available along the analogous path 141 in FIG. 2. Further, the invention allows access along the paths of arrows 140A-140D in FIG. 3. Each of the paths indicated by arrows 140A and 140C are perpendicular to the paths indicated by arrows 140B and 140D.

Two, a pair of radius arms 45 is shown in FIG. 3. The pair of arms forms a frame which supports the door 43. The three elements including plate 150, the pin (not numbered) located at pivot 54, and the frame act to form a hinge which allows the door 43 to rotate about the pivot 54. Similarly, nacelle frame 51, pivot 48, and the pair of arms 45 form a second hinge.

Three, simultaneous rotation of the radius arm 45 about the first pivot 48 occurs with rotation of the door 43 about the second pivot 54. However, "simultaneous" does not necessarily mean that the two rotational speeds are equal, nor that the amounts of each rotation are equal. In general, the speeds and amounts are not equal, as analysis of FIG. 8 will show.

The above embodiments disclose one of several hinges which can be employed in connection with the nacelle door of the present invention. Kinematics of this hinge mechanism can be adjusted to form a straight line instant center, through multiple hinge points. Thus, this hinge is particularly useful on curved surfaces such as nacelles.

Numerous modifications and substitutions can be undertaken without departing from the true spirit and scope of the invention. For example, the linkage of the invention can be used in automotive applications, such as in the hood or trunk of a car. The linkage would allow unrestricted access to the interior.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or Will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

We claim:

1. In an aircraft nacelle having an engine located in an interior of the nacelle, an apparatus comprising:
   a) a door for covering an opening in the nacelle, wherein said door includes an inner surface facing the interior of the nacelle when said door is in a closed position;
   b) a first pivot, wherein said first pivot is fixed with respect to the nacelle; and
   c) linkage means for
      (i) connecting said door to the nacelle,
      (ii) allowing said door to rotate about a second pivot, wherein said second pivot is fixed with respect to said door but is movable with respect to the nacelle,
      (iii) allowing said second pivot to rotate about said first pivot, and simultaneously opening said door and moving said door outward from the nacelle, thereby permitting access to the interior of the nacelle and avoiding any movement of said door inner surface toward the interior of the nacelle.

2. A kinematic hinge mechanism for use on a curved surface, the curved surface covering an interior, the hinge mechanism comprising:
   a) a first member which includes an inner surface facing the interior when said first member is in a closed position;
   b) a radius arm connecting between said first member and said curved surface, which
      i) is rotatably supported from the curved surface at a first pivot, wherein said first pivot is fixed with respect to the curved surface, and
      ii) supports a second pivot about which said first member is able to rotate, wherein said second pivot rotates about said first pivot; and
   c) means for causing simultaneous rotation of
      (i) said radius arm about said first pivot,
      (ii) said first member about said second pivot, and (iii) wherein said simultaneous rotation allows said first member to open with no movement of said first member inner surface toward the interior and provides an unrestricted access to the interior.

3. In an aircraft nacelle having an engine located in an interior of the nacelle, an apparatus comprising:
a) a door for covering an opening in the nacelle, wherein said door includes an inner surface facing the interior of the nacelle when said door is in a closed position;
b) a first pivot, wherein said first pivot is fixed with respect to the nacelle;
c) linkage means for
  i) connecting said door to the nacelle,
  ii) allowing said door to rotate about a second pivot, wherein said second pivot is fixed with respect to said door but is movable with respect to the nacelle,
  iii) allowing said second pivot to rotate about said first pivot, and
  iv) simultaneously opening said door and moving said door outward from the nacelle, thereby permitting access to the interior of the nacelle and avoiding any movement of said door inner surface toward the interior of the nacelle; and
d) wherein said linkage means comprises
  i) a door hinge rigidly attached to said door, wherein said door hinge includes a door crank which rotates about said second pivot with said door;
  ii) a radius arm which
    A) rotates about said first pivot, and
    B) supports said second pivot;
  iii) a radius arm crank which is rigidly fastened to said radius arm;
  iv) a means for driving said door crank and said radius arm crank, wherein said drive means comprises
    A) a drive crank which rotates about a third pivot, wherein said third pivot is fixed with respect to the nacelle,
    B) a door link which includes first and second ends, wherein
      1) said door link first end is pivotally connected to said drive crank, and
      2) said door link second end is pivotally connected to said door crank, and
    C) a radius arm link which includes first and second ends, wherein
      1) said radius arm link first end is pivotally connected to said drive crank, and
      2) said radius arm link second end is pivotally connected to said radius arm crank; and
  v) wherein rotation of said drive crank about said third pivot causes simultaneous rotation of
    A) said radius arm about said first pivot, and
    B) said door about said second pivot.

4. The apparatus recited in claim 3, further comprising:
a) a frame which includes said radius arm and a second radius arm, wherein
  i) said frame connects said door to the nacelle such that said door can rotate with respect to said frame about said second pivot, and said frame can rotate with respect to the nacelle about said first pivot;
b) a lock-down bar which includes
  i) a first end connected to said radius arm, and
  ii) a second end connected to said second radius arm;
c) a latch which is integral with said drive crank; and
d) wherein said latch engages said lock-down bar when said door is in a closed position, thereby preventing rotation of said door until said drive crank is rotated in a direction which allows disengagement of said latch from said lock-down bar.

5. The apparatus recited in claim 4, further comprising means for rotating said drive crank.

* * * * *